United States Patent [19]
Hetzel

[11] Patent Number: 5,389,311
[45] Date of Patent: Feb. 14, 1995

[54] ATMOMETER COVERING AND METHOD

[76] Inventor: Henry T. Hetzel, 1931 S. County Rd. 19, Loveland, Colo. 80537

[21] Appl. No.: 146,412

[22] Filed: Nov. 1, 1993

[51] Int. Cl.⁶ .............................................. G01N 19/10
[52] U.S. Cl. .................................... 261/104; 73/866.4
[58] Field of Search ................. 73/866.4; 261/104, 99

[56] References Cited

U.S. PATENT DOCUMENTS

| | | | |
|---|---|---|---|
| 2,904,258 | 9/1959 | Miller, Jr. | 261/104 |
| 3,788,545 | 1/1974 | Budd et al. | 261/104 |
| 3,953,566 | 4/1976 | Gore | 264/288 |
| 4,187,390 | 2/1980 | Gore | 261/104 |
| 4,194,041 | 3/1980 | Gore et al. | 428/315 |
| 4,489,016 | 12/1984 | Kriebel | 261/122.2 |
| 4,657,713 | 4/1987 | Miller | 261/104 |
| 4,709,585 | 12/1987 | Altenhofen | 73/866.4 |
| 4,921,642 | 5/1990 | LaTorraca | 261/104 |
| 4,935,169 | 6/1990 | Ernst | 261/104 |
| 5,000,884 | 3/1991 | Bassteld | 261/122.2 |

*Primary Examiner*—Tim Miles
*Attorney, Agent, or Firm*—Edward L. Miller

[57] ABSTRACT

A covering for an atmometer includes an expanded polytetrafluoroethylene barrier layer that allows the passage of water vapor but not of liquid water. The barrier layer my be covered with a fabric layer, and may be coated on either side with a hydrophilic layer. The covering fits over an evaporating plate that may have either a flat or a convex evaporating surface.

17 Claims, 3 Drawing Sheets

ATMOMETER COVERING AND METHOD

REFERENCE TO ISSUED PATENTS

This application is related to the subject matter disclosed in the following issued U.S. Patents, each of which is hereby expressly incorporated by reference:

U.S. Pat. No. 4,709,585, issued Dec. 1, 1987 and entitled METHOD AND APPARATUS FOR MONITORING ENVIRONMENTAL EVAPOTRANSPIRATION;

U.S. Pat. No. 3,953,566, issued Apr. 27, 1976 and entitled PROCESS FOR PRODUCING POROUS PRODUCTS; and U.S. Pat. No. 4,194,041, issued Mar. 18, 1980 and entitled WATERPROOF LAMINATE.

BACKGROUND OF THE INVENTION

The invention relates to instruments for measuring the evaporation of a liquid in an environment. Specifically, the invention relates to a device called an atmometer which models the water vapor diffusion resistance and the albedo of field crops.

The '585 patent describes an atmometer whose evaporation surface is covered with a green canvas material which simulates the albedo and diffusion resistance properties of a crop in order to provide an accurate estimation of evapotranspiration. A check valve in this instrument helps prevent precipitation from adversely affecting the gross evapotranspiration estimate.

Although the canvas covering has proven to be an effective simulator of crop canopy resistance, and a reliable check valve has been developed to prevent inflow of water from precipitation, some problems remain.

The canvas, which measures 0.020 inches thick, is somewhat stiff and bulky. When it is tied down to the flat evaporation surface of the atmometer there may be an air space of from 0.010 to 0.020 inch between the canvas and the wet surface of the porous ceramic. The air space adds significantly to vapor diffusion resistance and has been found to cause as much as an 8% decrease in evaporation rate. Also, the bulk of the canvas fabric will saturate with water during rain or heavy dew. To some extent this simulates natural wetting of a crop, but the amount is excessive. After precipitation there is an unnaturally long delay before water is again drawn from the instrument by evaporation because the saturated canvas must first dry.

The check valve is designed to remain tightly closed until a positive differential pressure threshold is reached. Because of this differential pressure, and also because of the weight of water between the elevated ceramic evaporation plate and its reservoir, a sub-atmospheric pressure exists in the cavity of the evaporation plate. If there is a bubble of air in the cavity, it may provide space for water from precipitation to enter the cavity even if the check valve is functioning properly.

A method tried by others to avoid problems caused by precipitation has been to shelter the evaporation surface by a transparent sheet that is high enough to allow free circulation of air and clear enough not to block solar radiation to the surface significantly. This method has proved cumbersome and inadequate in practice.

Canvas covers of the type described in the '585 patent may come treated with water repellents. In my experience they are not sufficiently waterproof. For example, they tend to become saturated in driving rain. Furthermore, since they are in contact with the evaporating surface below, they tend to wick water down onto that evaporating surface where it is absorbed. This absorbed water produces significant error in the evaporation measurement. Moreover, repellents rapidly lose their effectiveness due to weathering.

SUMMARY OF THE INVENTION

My invention replaces the canvas covering of the atmometer evaporation surface with a thin and conformable sheet of waterproof material which readily passes water vapor but is impervious to liquid water. The waterproof material may be a laminated structure: a top layer of fabric for protection and proper solar radiation absorption, a hydrophilic layer which blocks contamination from reaching an underlying microporous hydrophobic underlayer, and a bottom hydrophilic layer which adheres to the ceramic evaporation surface. The evaporation surface it covers may be flat, or it may be crowned in order that precipitation or large amounts of dew collecting on the covering will run off. By not allowing liquid water to pass through the covering and by not allowing it to accumulate on or in the covering, the various drawbacks of canvas covers and the need for a check valve are overcome.

DESCRIPTION OF A PREFERRED EMBODIMENT

Figure 1:
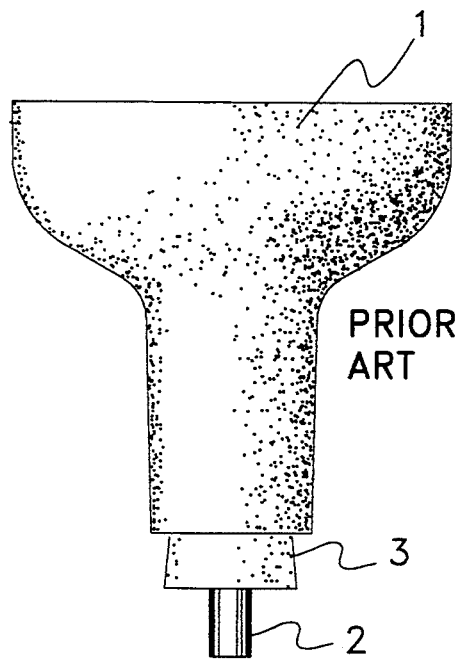
FIG. 1 shows a known ceramic Bellani Plate.

FIG. 1 shows a conventional evaporation plate 1 (e.g. No. 7C Standardized white ceramic Bellani plate sold by C&M Meteorological Supply, P.O. Box 5723, Riverside, Calif. 92517). It is a hollow cup made of a porous ceramic material that is sealed on all exterior surfaces except the top which is flat and provides a well defined area of free water brought to the surface by capillary forces in the porous ceramic. (Evaporation plates of a material other than ceramic might be used.) Water from a reservoir is continuously supplied to the interior cavity of the cup through tubing 2 and stopper 3 in the neck of the cup. The capillary forces exclude air from entering the cup through the saturated evaporation surface (more than two atmospheres of pressure would be required for air entry) but water from precipitation will easily enter the unprotected surface.

As shown in the '585 patent, a covering over the evaporation surface can be used to simulate the diffusion and albedo characteristics of a crop. My covering has one or more barrier layers designed to stop passage of liquids but allow vapors, specifically water vapor, to pass through freely. A barrier layer 4 of my covering is shown in FIGS. 2A through 2E. It allows water vapor to pass through it with much less resistance than vapor experiences transpiring from a crop canopy, but it blocks liquid water transmission. (The arrows in FIGS.

2A through 2E show the direction of vapor flow.) A number of materials can be used: tightly woven fabrics of fine hydrophobic fibers, including polyolefin fibers such as polyethylene and polypropylene, polytetrafluoroethylene fibers, and other fibers treated with hydrophobic agents. Also, tightly spaced nonwoven webs of the above described fibers may be used. A film of porous, expanded polytetrafluoroethylene, which has been heated above its crystalline melt point after expansion, has been found to be an ideal hydrophobic layer for this application. (See the '566 patent incorporated by reference.)

By laminating a colored fabric 5 above this expanded polytetrafluoroethylene layer 4, benefits in strength and durability are gained as well adding diffusion resistance and solar radiation absorption characteristics that can be made to match a canopy of leaves. This combination is shown in FIG. 2B.

The addition of a hydrophilic film 6 to the bottom surface of the hydrophobic film 4 gives a wetting and sealing characteristic to the laminate-to-ceramic interface. To apply this covering one first covers the ceramic surface with a pool of water and then smooths the laminate into place, forcing free water out and thus eliminating trapped air. The result is a seal made to the surface which remains intact indefinitely. By so excluding all air spaces with their additional and variable vapor diffusion resistances, I have been able to produce evaporation rates in a group of atmometers which agree with each other within a couple of percent. This bottom hydrophilic layer or coating 6 is shown in FIG. 2C.

Figure 2A:
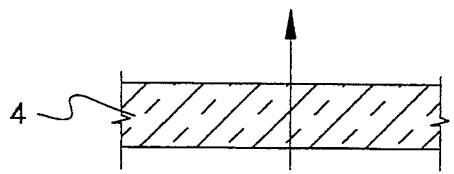
FIGS. 2A–2E illustrate various laminate structures of the covering material.
Figure 2D:
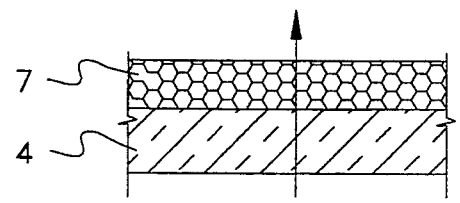
Figure 2B:
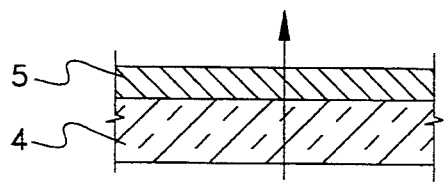
Figure 2E:
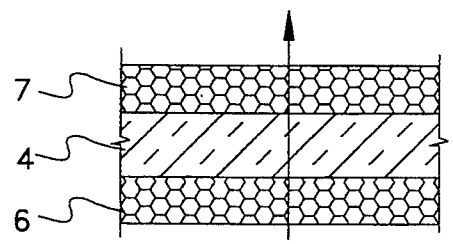
Figure 2C:
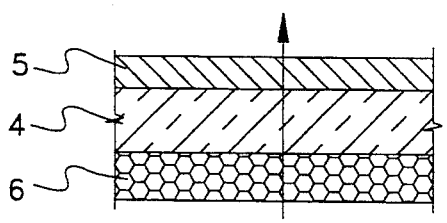

FIGS. 2D and 2E show additional hydrophilic layers bonded above the hydrophobic layer 4 of FIG. 2A. This layer can be useful for protecting the hydrophobic layer from contamination, as described in the '041 patent. The hydrophobic layers of FIGS. 2B and 2C can be protected in the same way.

Figure 5:
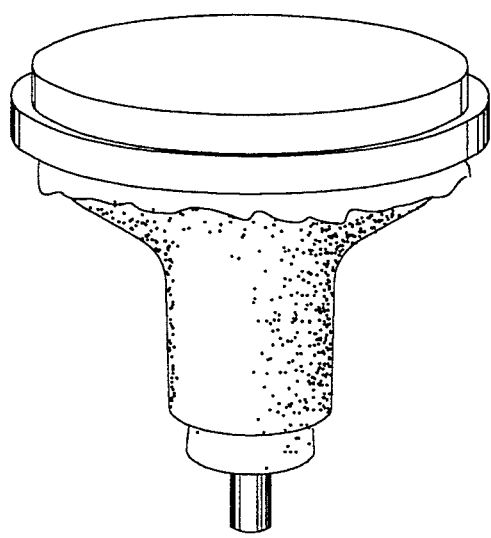
FIG. 5 shows the mounted covering.
Figure 3A:
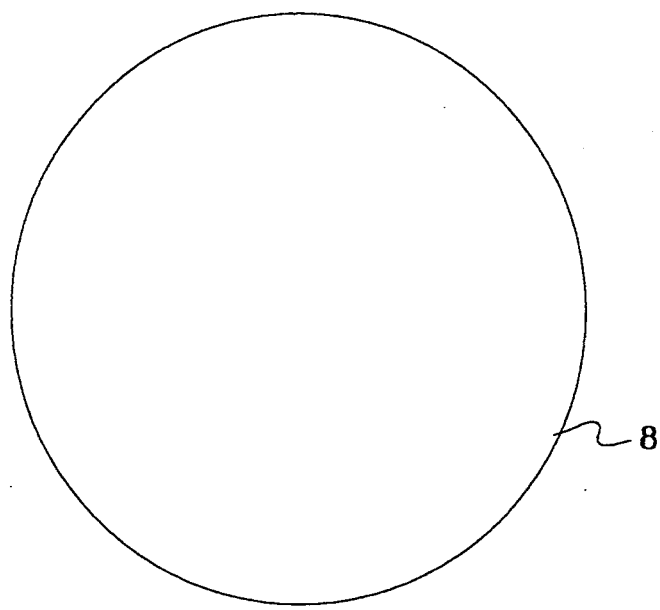
FIGS. 3A and 3B are a top and side view of the unmounted covering.
Figure 3B:
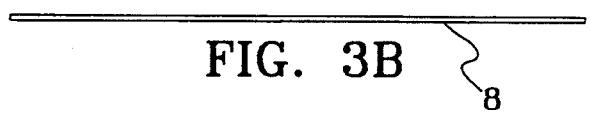
Figure 4A:
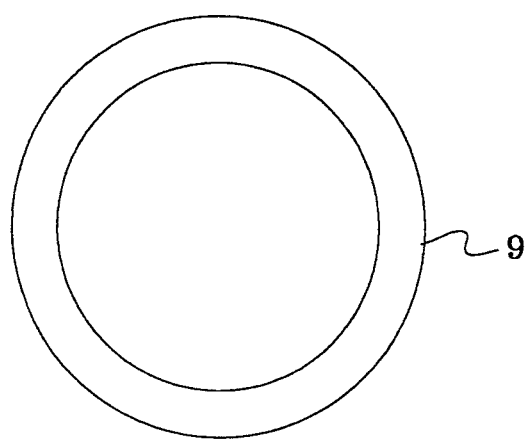
FIGS. 4A and 4B are a top and side view of the unmounted elastic retaining band.
Figure 4B:
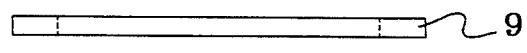

FIGS. 3A and 3B show a disk shaped covering 8 which is 3¾ inches in diameter and about 0.009 inch thick. FIGS. 4A and 4B show an elastic retaining band 9 of silicone rubber. The elastic retaining band 9 in its unstretched form is a ⅛ inch thick annulus 2.8 inches outside diameter by 2.2 inches inside diameter. When as shown in FIG. 5, the elastic retaining band is stretched over the covering 8 and the ceramic plate 1 or 6, it holds the covering 8 securely in place. There are no wrinkles on the top surface.

Figure 6:
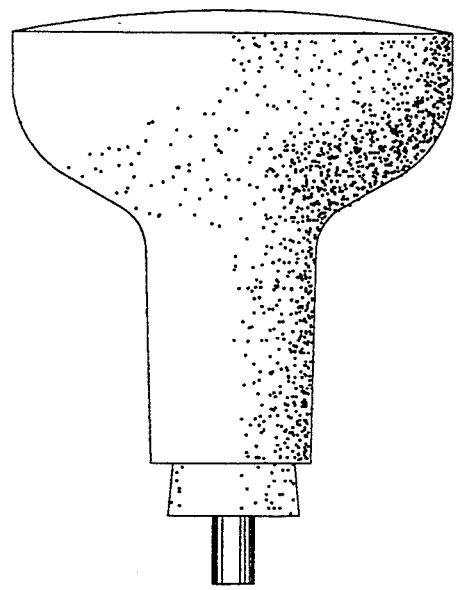
FIG. 6 depicts a side view of a Bellani Plate with domed evaporation surface.

If rain or dew cannot penetrate a Bellani plate, it may puddle or bead in droplets on the surface and at least partially defeat the benefit of waterproofing because this water will block evaporation from portions of the surface. FIG. 6 shows a modification to the known Bellani plate 1. Instead of being flat, the top evaporation surface is domed with a convex shape. A preferred shape is approximately spherical with radius of about six inches, but other approximately quadric convex surfaces may be employed. Precipitation can now run off the surface without pooling and with only minimal beading. Bellani plates, which are made by a slip casting process in plaster molds, can be made with domed tops by including an appropriate concave surface in the mold.

If the laminate coverings shown in FIGS. 2D or 2E are used on the domed plate, and the hydrophilic layers shown have hydrophilic surface properties, water will sheet off easily and leave only a thin layer of water on the surface which evaporates rapidly. This is because a drop of water placed on a hydrophilic surface forms an advancing water contact angle of less than 90 degrees that wets spontaneously. A thin continuous sheet will readily develop allowing water to drain from a sloping surface. A similar variation is the laminate covering of FIG. 2C inverted so that the fabric side contacts the domed ceramic surface and the hydrophilic layer is uppermost. This configuration also benefits from the added strength of the fabric, and from the vapor diffusion characteristics of the fabric, which may be desirable. Where fabric is not used on the top surface, the uppermost layer may be dyed or a fine mesh screen placed over it to create the approximately 0.8 emissivity necessary to simulate the solar radiation absorption characteristics of a crop.

One covering material I have successfully used is manufactured by W. L. Gore & Associates, Inc.. It is their Gore-Tex fabric 2132216S9M00A Two-Layer 2.2 oz. U.S. 101 #3861 Green. This 0.009 inch thick material is a flexible lamination of the form shown in FIG. 2C. The '566 and '041 patents describe this type of material and other materials which may perform similarly. The '566 patent introduces microporous expanded hydrophobic polytetrafluoroethylene film, and the '041 patent describes the hydrophilic layer in combination with the hydrophobic film. The two films together have a moisture vapor transmission rate exceeding 1000 grams per meter squared per day, and according to information published by W. L. Gore Inc., the combined rate is in the range of 8000 to 12000 gms/m² day.

Column 2 line 45 in U.S. Pat. No. 4,110,392 describes how pigments can be added directly to the hydrophobic tetrafluoroethylene film if desired. U.S. Pat. No. 4,942,214 reveals polyurethane coatings for use in the hydrophilic layer, and U.S. Pat. No. 4,969,998 describes improved semipermeable membranes for use in waterproof materials with much improved flux of low molecular weight polar molecules such as water vapor, and improved hydrolytic stability.

The atmometer covering and domed Bellani plate disclosed herein may be used with a wide variety of atmometers besides those mentioned in the '585 patent. For example, either or both may be used with an automatic atmometer such as is disclosed in my patent application Ser. No. 07/845,611, entitled METHOD AND APPARATUS FOR AUTOMATIC MEASUREMENT OF EVAPOTRANSPIRATION on Mar. 4, 1992.

I claim:

1. Evaporation apparatus comprising:
   an evaporating plate susceptible to meterological precipitation having an evaporating surface and a water supply inlet connectable to a water supply; and
   a covering disposed against the evaporating surface and including a barrier layer that is permeable to water vapor originating at the evaporating surface and that prevents meterological precipitation from entering the evaporating surface.

2. Evaporation apparatus as in claim 1 wherein the evaporating surface is flat.

3. Evaporation apparatus as in claim 1 wherein the evaporating surface is convex.

4. Evaporation apparatus as in claim 1 wherein the covering has an albedo mimicking that of an agricultural crop of interest.

5. Evaporation apparatus as in claim 1 wherein the evaporating surface has a generally circular boundary and further comprising an annular elastic retaining band disposed over the covering and proximate the circular boundary.

6. Evaporation apparatus as in claim 5 wherein the annular elastic retaining band is of silicone rubber.

7. Evaporation apparatus as in claim 1 wherein the barrier layer comprises expanded polytetrafluoroethylene.

8. Evaporation apparatus as in claim 7 wherein the covering further comprises a hydrophilic layer, and the barrier layer is between the hydrophilic layer and the evaporating surface.

9. Evaporation apparatus as in claim 7 wherein the covering further comprises hydrophilic layers on each side of the barrier layer.

10. Evaporation apparatus as in claim 7 wherein the covering further comprises a fabric layer.

11. Evaporation as in claim 10 wherein the barrier layer is between the fabric layer and the evaporating surface.

12. Evaporation apparatus as in claim 11 wherein the covering further comprises a hydrophilic layer disposed between the barrier layer and the evaporating surface.

13. Evaporation apparatus comprising:
an evaporating plate having an evaporating surface and a water supply inlet connectable to a water supply; and
a covering disposed against the evaporating surface, the covering including a barrier layer of expanded polytetrafluroethylene that is permeable to water vapor and impervious to liquid water, including a fabric layer, the barrier layer being between the fabric layer and the evaporating surface, and including a hydrophilic layer disposed between the barrier layer and the evaporating surface.

14. Evaporation apparatus comprising:
an evaporating plate having an evaporating surface and a water supply inlet connectable to a water supply; and
a covering disposed against the evaporating surface and including a barrier layer of expanded polytetrafluoroethylene that is permeable to water vapor and impervious to liquid water, and also including hydrophilic layers on each side of the barrier layer.

15. A method of preventing meteorological precipitation from reducing the area of an evaporating surface, the method comprising the steps of:
providing the evaporating surface with a convex shape of radius sufficient to prevent pooling of meteorological precipitation; and
covering the convex shape of the evaporating surface with a hydrophobic membrane that is permeable to vapor evaporated from the evaporating surface.

16. A method as in claim 15 further comprising the step of covering the hydrophobic membrane with a hydrophilic layer.

17. A method as in claim 15 further comprising the step of providing an albedo that approximates that of an agricultural crop of interest.

* * * * *